Feb. 5, 1952     L. L. JONES     2,584,712
MOLDING MACHINE AND PROCESS

Filed Oct. 26, 1946     4 Sheets-Sheet 1

INVENTOR.
Lester L. Jones
BY *James and Franklin*
ATTORNEYS

Feb. 5, 1952 L. L. JONES 2,584,712
MOLDING MACHINE AND PROCESS
Filed Oct. 26, 1946 4 Sheets-Sheet 3

INVENTOR.
Lester L. Jones
BY James and Franklin
ATTORNEYS

Feb. 5, 1952  L. L. JONES  2,584,712
MOLDING MACHINE AND PROCESS
Filed Oct. 26, 1946  4 Sheets-Sheet 4

INVENTOR.
Lester L. Jones
BY
James and Franklin
ATTORNEYS

Patented Feb. 5, 1952

2,584,712

UNITED STATES PATENT OFFICE 2,584,712

MOLDING MACHINE AND PROCESS

Lester L. Jones, Oradell, N. J., assignor to Conmar Products Corporation, Newark, N. J., a corporation of New Jersey Application October 26, 1946, Serial No. 703,541

23 Claims. (Cl. 18—30)

This invention relates to molding machines, and more particularly to a machine for automatically molding a chain or stringer of very small units, and especially for molding such units out of a thermosetting material.

The primary object of the present invention is to generally improve apparatus for making a chain of small units, and more specifically for making slide fastener stringers with plastic elements or "scoops."

Slide fasteners made out of ordinary thermoplastics have been found relatively unsatisfactory to withstand the heat of laundering and pressing. It is known that thermosetting plastics would be the best plastics for this purpose, but injection molding apparatus is not satisfactory for use with thermosetting materials because the material cannot be re-softened in the sprue. Furthermore, even with thermoplastic material, injection molding has the disadvantage of leaving the molded element marred at the point where the sprue joins the element. One object of the present invention is to provide molding apparatus which is satisfactory for use with infusibly thermosetting material (although the apparatus is also useable with thermoplastics and even with metals).

The apparatus is specifically applied to the manufacture of slide fasteners. The fastener comprises stringers, that is, cloth tapes with a series of fastener elements secured along one edge of the tape. The present apparatus accordingly includes a mold the separable halves of which may be clamped on opposite sides of a tape, with one edge of the tape disposed in the mold cavity which forms the fastener element. It is evident that each charge of molding material for a single fastener element is relatively minute, yet must be accurately measured if the element is to be solid and of proper dimension. In accordance with a feature and object of the present invention, the molding material is preliminarily formed into a wire or rod of uniform diameter, and the apparatus severs short lengths of this wire or rod and transfers the resulting rodlets to the die by means of a plunger, each rodlet corresponding to one of the fastener elements.

If the fastener elements are of the conventional scoop type, there is some difficulty in forming the recess or pocket of the scoop. The die preferably opens in a direction transverse to the plane of the tape, so that the tape may be clamped between the halves of the die. The pocket, however, extends in the direction of the tape. It is accordingly a further object of the present invention to provide means for forming a pocket in each fastener element, and this is done by using the transfer plunger as a part of the die, and more specifically, as a core for forming the pocket.

The rodlets are severed, preferably after some preheating at the end of the rod, and are then moved to a transfer station where the plunger transfers a rodlet through a nozzle to the die, said nozzle preferably heating the material enough to react the same when it reaches the die. Both the severing operation and the movement of the severed rodlet to the transfer plunger may be accomplished by an intermittently rotatable dial having a circle of chambers which pass the feed channel for the rod of material at one point, and which come between the transfer plunger and the nozzle at another point.

Further objects of the present invention are to ensure a tight fit between the dial and the nozzle, and between the nozzle and the die, during the transfer operation, and to ensure complete separation of the nozzle from the die after each molding operation. With this object in view, the apparatus includes means affording bodily movement of the dial, transfer plunger, and nozzle relative to the die, and at the beginning of each molding operation the dial is cammed toward the die, thereby clamping the dial against the nozzle and the nozzle against the die.

To accomplish the foregoing objects, and other more specific objects which will hereinafter appear, my invention resides in the molding machine elements, and process steps, and their relation one to the other, as are hereinafter more particularly described in the following specification. The specification is accompanied by drawings, in which:

Figures 10, 12:
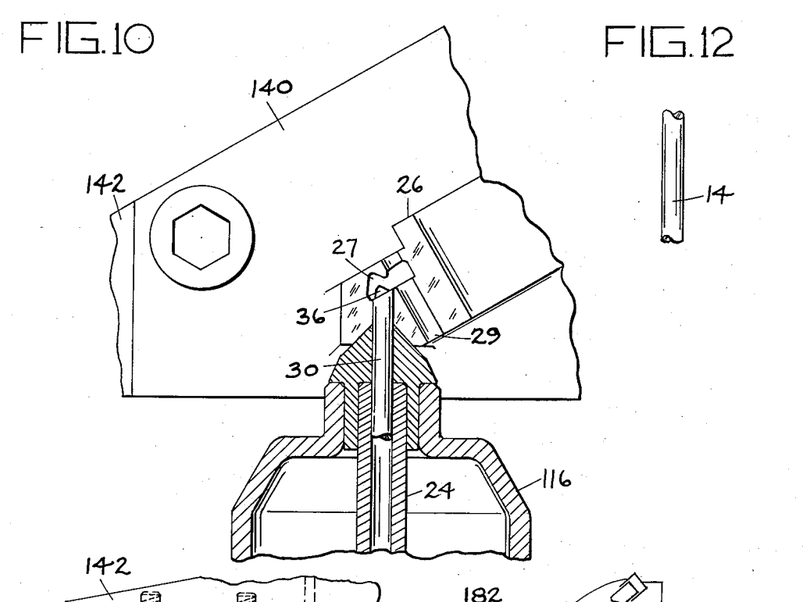
Fig. 10 is a vertical section similar to the nozzle portion of Fig. 1, but drawn to enlarged scale.
Fig. 12 shows a fragmentary length of rod or wire made out of unreacted thermosetting material.

Referring to the drawings, and more particularly to Fig. 12, I have found that a thermosetting material may be formed into a long rod or wire, a fragment of which is indicated at 14 in Fig. 12. The material may be one of the phenolic resins, the furane resins, the melamine resins, or the urea resins. The material is extruded under pressure, and under a temperature accurately controlled to closely limit the reaction of the material as it is formed into a rod. There is a slight preliminary reaction, which on the one hand is great enough to convert the molding powder into a rod which may be handled conveniently, and yet which on the other hand is slight enough so that on further heating the material may be softened and the reaction continued.

The present apparatus contemplates the use of molding material in rod form because of the convenience with which it may be handled and may be severed into measured lengths each corresponding to one of the fastener elements to be molded.

Figure 1:
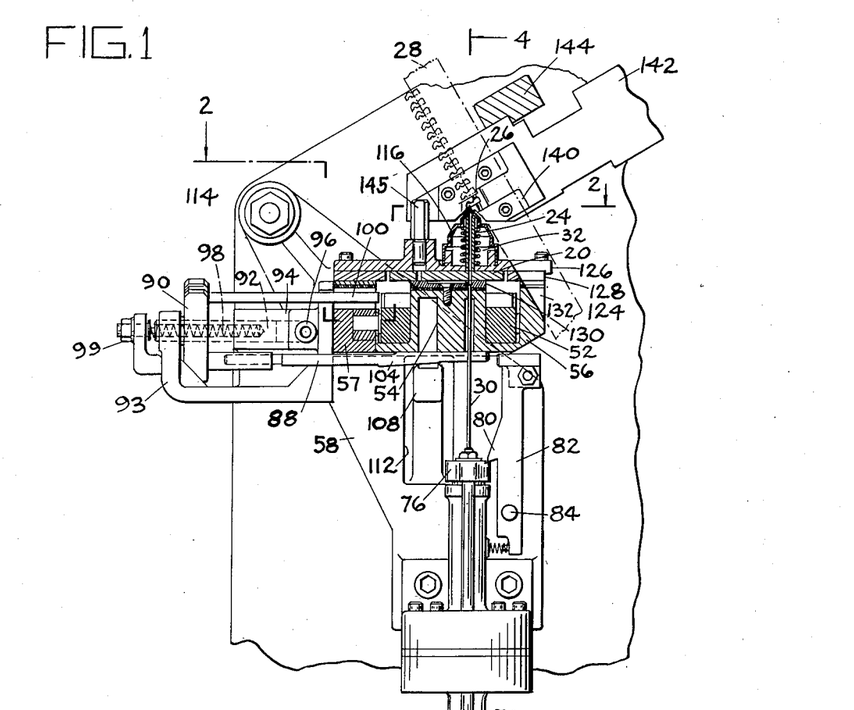
Fig. 1 is a partially sectioned elevation of apparatus embodying features of my invention.
Figure 3:
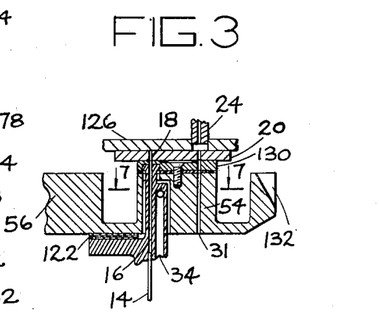
Fig. 3 is a vertical section through a part of the apparatus, and is taken approximately in the plane of the line 3—3 of Fig. 7.

Referring to Fig. 3, a rod 14 of the molding material is fed through a channel 16 to a chamber 18 in an intermittently rotatable dial 20. The rod 14 is urged upwardly as far as it will go, as, for example, by the use of continuously rotating frictional feed wheels 22 shown in Fig. 13, and when the dial 20 (Fig. 3) rotates, it severs a measured length or rodlet from the upper end of the rod, this length being determined by the thickness of the dial 20. The dial moves the resulting rodlet to a transfer station where the chamber is aligned with a nozzle 24. In Fig. 1, it will be seen that nozzle 24 leads upwardly to a mold 26, the separable halves of which are clamped on opposite sides of a slide fastener tape 28. The nozzle 24 above dial 20 is aligned with a transfer plunger 30 below the dial. When plunger 30 is forced upwardly, it transfers the rodlet through nozzle 24 into die 26. During its passage through the nozzle, the material is heated, as for example, by means of radio-frequency heating provided in the present case by a radio-frequency coil 32 surrounding the nozzle. If desired, the material may be preheated before the severing operation, and for this purpose heating passages 34 (see Fig. 3) are provided adjacent the feed channel 16 for the rod 14.

Referring now to Fig. 10 of the drawing, it will be seen that the upper end of plunger 30 acts as a part of the mold 26, and that in its uppermost position it not only defines a part of the bottom of the fastener element, but more specifically, includes a core 36 which forms a pocket in the bottom of the fastener element. The fastener element is molded in cavity 27, and the head of the tape is received in a groove 29.

Figure 2:
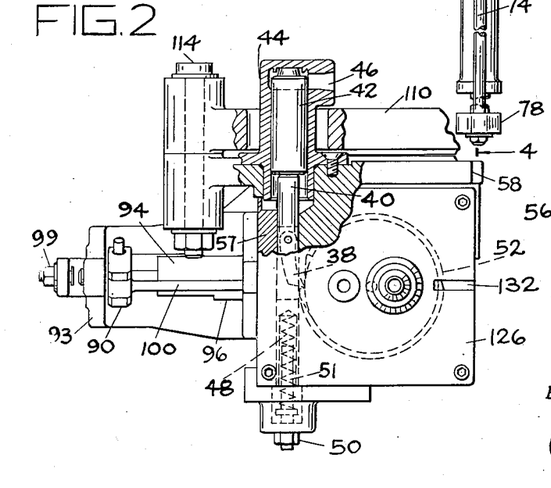
Fig. 2 is a partially sectioned plan view taken approximately in the plane of the line 2—2 of Fig. 1.

Considering the apparatus in greater detail, the dial 20 (Fig. 5) is intermittently rotated in the present case by a pawl 38, carried by a slide 40, pushed by an hydraulic plunger 42. Referring now to Fig. 2, it will be seen that plunger 42 reciprocates in a cylinder 44 having an inlet connection at 46. The opposite end of slide 40 bears against a return spring 48. The length of stroke may be accurately adjusted by means of a screw and lock nut at 50, controlling a stop rod 51.

Figures 4, 5, 6, 7:
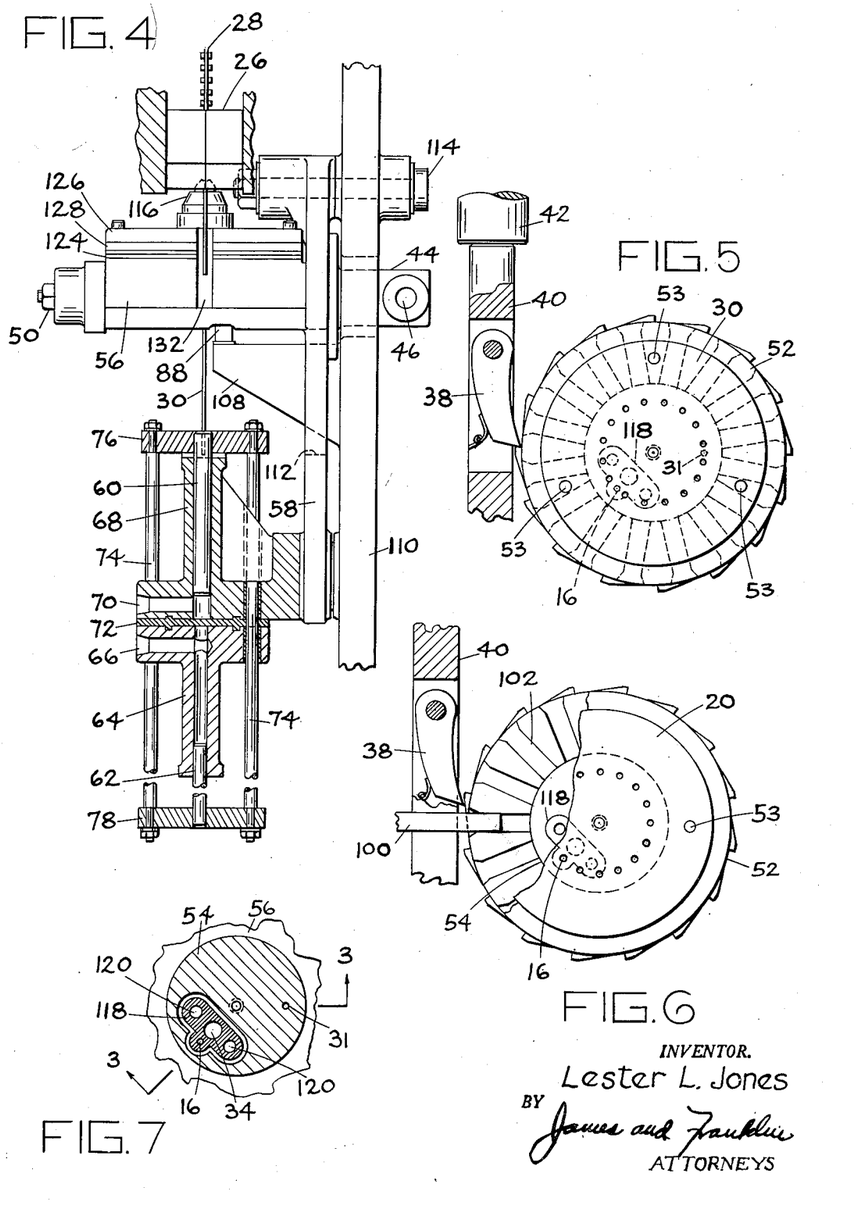
Fig. 4 is a partially sectioned elevation taken approximately in the plane of the line 4—4 of Fig. 1.
Fig. 5 is a horizontal view showing the dial with its pawl and ratchet mechanism.
Fig. 6 is a similar view, with a part of the dial cut away to show the pilot mechanism.
Fig. 7 is a horizontal section taken approximately in the plane of the line 7—7 of Fig. 3.
Figures 8, 9:
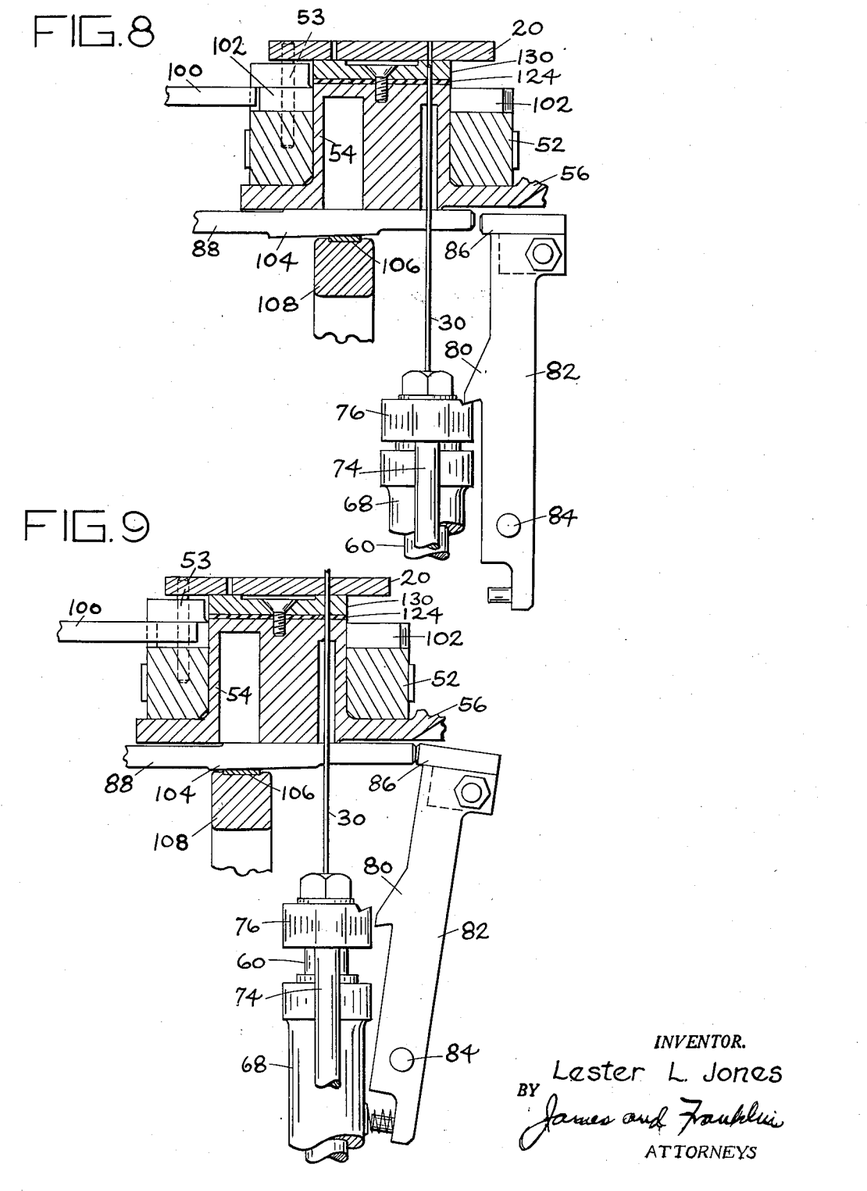
Fig. 8 is a vertical section similar to the dial portion of Fig. 1, but drawn to enlarged scale.
Fig. 9 is a similar view, but showing the relation of the parts after the plunger has been released.

As here exemplified, the pawl does not act directly on the dial 20. It cooperates with a ratchet wheel 52 which is located below the dial, as is best shown in Figs. 1, 8 and 9. They are connected by suitable means, in this case three vertical dowels 53 (Figs. 5, 8, and 9). The ratchet wheel 52 rotates about a stationary hub 54. In Fig. 3, the hub 54 is shown with the ratchet wheel removed. The hub is a part of a larger casting 56 which in turn is bolted to a wall 58, best shown in Figs. 1 and 4. The guide passage for the slide 40 carrying pawl 38, is formed in the casting 56, with guide 57 added.

In the present example of the invention the vertical transfer plunger 30 is controlled by a pair of opposed pistons 60 and 62 (Fig. 4). Piston 60 is larger in diameter than piston 62. The latter slides in a cylinder 64 which is connected at 66 to a tank or source of hydraulic power. Piston 62 acts as a hydraulic spring which is continuously urged downwardly and which functions to restore the plunger 30 to its initial or downward position. The piston 60 moves in a cylinder 68 which is connected at 70, through appropriate valve mechanism, to the tank. When pressure fluid is admitted, the piston 60 tends to force the transfer plunger 30 upwardly despite the opposition of piston 62. The cylinders 64 and 68 are separated by a partition 72. The pistons are connected together for simultaneous movement by means of a pair of tie rods 74, these being connected to piston 60 through cross-head 76, and to piston 62 through cross-head 78.

In the specific apparatus here shown, pressure fluid is admitted to cylinder 68 ahead of time, and the instant of upward movement of the plunger is determined by release of a restraining latch. Referring to Fig. 8, latch 80 engages the upper cross-head 76 and so prevents the piston 60 from raising plunger 30. Latch 80 is carried on an arm 82 pivoted at 84 and having at its upper end a boss 86 disposed in the path of a slide 88. Referring now to Fig. 9, it will be seen that slide 88 has been moved to the right, thereby turning the arm 82 and moving the latch 80 away from cross-head 76. This permits plunger 30 to be forced upwardly through dial 20, as shown.

Reverting now to Fig. 1, slide 88 is connected at its outer end to a cross-head 90. This is moved outwardly by a piston 92 slidable in a cylinder 94. A pipe for hydraulic power may be connected to the closed end of the cylinder at an inlet 96. Thus the piston moves the cross-head 90 outwardly, or toward the left, as viewed in Figs. 1 and 2. It is urged inwardly, or to the right, by means of a compression spring 98. The outer end of piston 92 is guided in a stationary bearing 93, and the spring pressure may be adjusted at 99.

The movement of cross-head 90 accomplishes two other purposes in the present machine. One is to pilot the dial to exact desired position. Another is to clamp the dial, nozzle and die tightly together to prevent leakage of the molding material. For the first purpose, the cross-head 90 carries a horizontally slidable pilot 100. The top surface of the ratchet wheel 52 is provided with pilot slots best shown at 102 in Fig. 6, which figure also shows the pilot 100 entering one of the slots. Comparing Figs. 8 and 9, it will be seen that in Fig. 8, when the slide 88 is in retracted position, the pilot 100 is also in retracted position, and is clear of the pilot slots 102, whereas in Fig. 9, when the slide 88 has moved to the right, the pilot has also moved to the right, and has entered one of the pilot slots 102. Figs. 5 and 6 show how the outer ends of the pilot slots 102 are preferably tapered or divergent in order to more readily receive the pilot 100.

In the specific form of the invention here shown, the third function which results from movement of cross-head 90 is taken care of by means of a wedge-like cam surface 104 formed at the bottom of slide 88, as is best shown in Figs. 8 and 9. This cam surface rides on bearing material 106 formed on a stationary arm 108 which forms a part of the main stationary frame of the machine. In Figs. 1 and 4, it will be seen that the arm 108 projects from the stationary side plate 110 of the machine, and that it passes through an enlarged opening or window 112 in the plate 58 previously referred to. Plate 58 is pivotally mounted at 114 on stationary frame 110, as is best shown in Figs. 1, 2 and 4. The dial, nozzle and the various hydraulic cylinders so far described, are all mounted on the plate 58, and are thereby adapted for a small movement in a generally vertical direction, that is, toward or away from the die 26. When the slide 88 moves to the right, as shown in Fig. 1, the wedge or cam 104 reacts against the stationary bracket 108 to force the mechanism upwardly. This clamps the upper end of the nozzle 24 against the die, and at the same time clamps the lower end of the nozzle against the dial, the nozzle being slightly yieldable in a vertical direction because of the springy nature of a thin sheet metal housing 116 which carries the upper end of the nozzle. Fig. 3 shows to exaggerated extent how the lower end of nozzle 24 may separate from dial 20 when the dial is lowered by retraction of the wedge 104.

It was already mentioned that the rod 14 may be preheated as it passes through channel 16. Referring to Fig. 7, it will be seen that channel 16 is formed in a separate member 118 having two small heating passages 120, as well as the larger heating passage 34 previously mentioned. Steam is preferably used as the heating medium, and the steam supply is connected to the lower ends of passages 120. At their upper ends, the passages 120 communicate with the passage 34, so that the steam flows countercurrent to the material in the passage 34, which passage is closest to the feed channel 16.

The severed rodlet of material is further heated during its passage through the nozzle 24. This may be done in a number of ways, but for rapidity and for uniform heating throughout the rodlet, I prefer to employ radio-frequency heating. For this purpose, a radio frequency coil 32 surrounds the nozzle, as previously described, it being protectively housed by the shell 116 which carries the upper end of the nozzle. The radio-frequency oscillator circuit and associated apparatus may be of conventional character, and therefore require no detailed description, and are not shown in the drawing.

The heated parts are preferably insulated from the main body of the machine. Thus in Fig. 7 there is an air space between the heated part 118 and the hub 54. Fig. 3 shows the introduction of heat insulating material at 122 for the same purpose. There is also a layer of heat insulating material between the dial assembly and the subjacent casting, this being best shown at 124 in Figs. 8 and 9.

The dial 20 rotates between stationary plates located directly above and beneath the dial. The stationary top plate 126 is generally square in outline, as is best shown in Fig. 2. Directly beneath plate 126 is another plate 128 (Figs. 1 and 4), which is also square in outline, but which is cut away at the center to surround the dial. Beneath the dial 20 and above the hub 54 is a circular stationary plate 130 (Figs. 1, 3, 8 and 9). This is screwed to the hub 54 and acts as an extension of the hub, but is made separately for a number of reasons. One is that it may be made of hardened steel and accurately finished on its top surface for close engagement with the dial 20. Another is that heat insulating material 124 may be disposed between the plate 130, and the hub 54 leading through casting 56 to the rest of the machine. Still another is that a convenient way to change the length of the rodlet is to employ a dial of appropriately changed thickness. The difference in the dial thickness may be compensated by an opposite difference in the thickness of the bottom plate 130.

In Figs. 1, 2, 3 and 4, it will be observed that a slot 132 is cut through the plates 126 and 128, and through a part of the casing 56. This slot is for passage of the tape 28 previously referred to, and the slot is accordingly disposed at an angle corresponding to the angle of the tape.

Figures 11, 13:
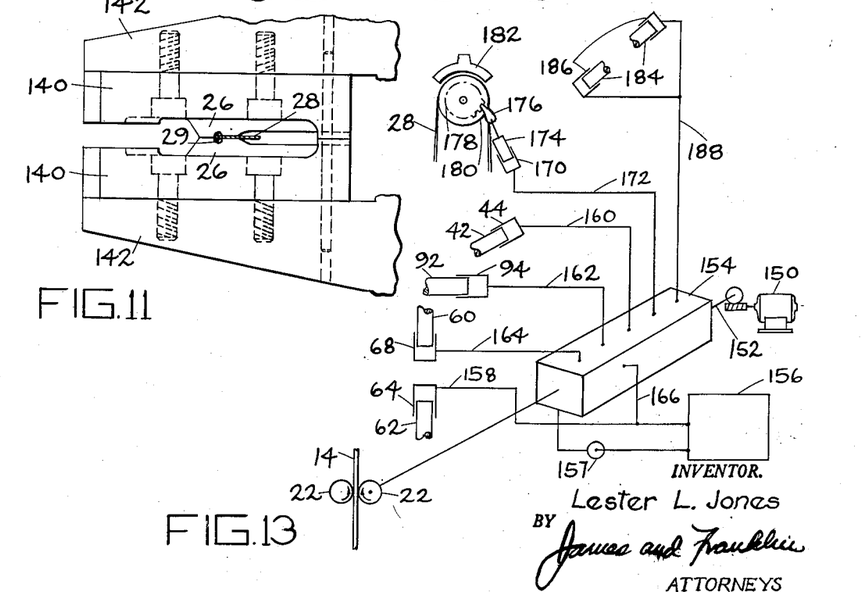
Fig. 11 is a plan view at the die.
Fig. 13 is a diagram showing in schematic form one timing arrangement for timing the operation of the parts of the apparatus.

Referring now to Figs. 10 and 11, the separable die portions 26 form a part of larger die blocks 140, which in turn are bolted to oppositely movable heads 142. Reverting to Fig. 1, the oppositely movable heads 142 slide in contact with a stationary support 144, which supports the heads against the upward force of nozzle 24 when wedge 104 urges the dial and nozzle assembly upwardly about pivot 114. A pilot stud 145 acts to center the die relative to the nozzle. It is large enough to fill the space between the die halves, but small enough not to prevent tight closing of the mold.

The various parts of the apparatus so far described may be operated in proper time sequence by any desired timing means. One arrangement is schematically shown in Fig. 13, referring to which it will be seen that a motor 150 drives a valve-operating shaft 152 which operates a series of valves in a suitable valve box 154. Shaft 152 also turns friction feed wheels 22 which urge the rod 14 of molding material upwardly into the dial, as previously described. Pressure fluid is supplied from a tank 156, the returned fluid being compressed by a pump 157. Tank 156 is continuously connected by means of pipe 158 to the cylinder 64 and piston 62 previously referred to as causing downward or return movement of the transfer plunger 30 (Fig. 1).

The cylinder 44 (Fig. 13) and piston 42 which operate the pawl for intermittently rotating the dial, are connected to the valve box by pipe 160. The cylinder 94 and piston 92 for operating the cross-head 90 (Fig. 1) with its wedge slide 104 and pilot bar 100, are connected to the valve box by pipe 162 (Fig. 13). The cylinder 68 and piston 60 for raising the transfer plunger are connected to valve box 154 by pipe 164. The valve box is supplied with high pressure fluid through pipe 166.

In addition to the foregoing cylinders, a tape feed cylinder 170 is connected to valve box 154 through pipe 172. The piston 174 of cylinder 170 operates a pawl 176 engaging a ratchet wheel 178, which in turn drives a tape drum 180 which feeds the tape 28 intermittently upwardly. The drum 180 preferably has a knurled surface, and the tape is held in frictional engagement therewith by means of a smooth spring-pressed shoe 182. The die is opened and closed by opposed pistons 184 operating in cylinders 186 connected by means of a pipe 188 to the valve box.

It will be understood that appropriate valves in valve box 154 are operated in proper time sequence by a series of cams or equivalent mechanism driven by the valve operating shaft 152, previously referred to. These valves admit pressure fluid from pipe 166 to any of pipes 160, 162, 164, 172 and 188, or discharge fluid from any of the said pipes to the pump 157.

If straight rods of molding material are prepared in a separate apparatus, the rods should have square ends so that they may be fed end to end, one after another, to the dial. In such case the elementary feed wheels shown in Fig. 13 may be supplemented by additional feed wheels spaced beneath those shown, with appropriate guide tubes or idler rollers, so that successive rods may be handled. The rods may be supplied to the feed mechanism manually, or by automatic means working from a magazine of rods. If the extrusion apparatus is combined with the present molding apparatus, a continuous rod of material may be supplied to the feed mechanism. If the fastener elements being made are very small, so that the plastic wire is quite thin, it may be coiled in a roll of large diameter, thereby providing a continuous supply.

It is believed that the construction and operation of my improved molding apparatus, as well as the advantages thereof, will be apparent from the foregoing detailed description. Unlike injection molding apparatus, the present apparatus is adapted to handle infusibly thermosetting materials. Such resins are best adapted to withstand the heat of laundering or pressing clothing. However, the apparatus may also be used with thermoplastics, and even with metal. Although the amount of material required for each fastener element is minute, the material is accurately measured and easily handled, this being made possible to a considerable extent by the preliminary formation of the molding material into a wire or rod of uniform diameter, from which short lengths or rodlets are severed. The molding operation, and particularly the formation of the hollow pocket in the fastener element, is facilitated by using the transfer plunger as a core forming a part of the die itself. A slight relative movement between the nozzle and the die is provided, this having the advantage of squeezing the dial, nozzle and die tightly together during the transfer and molding operations, yet ensuring complete separation of the nozzle from the die after each molding operation.

It will be understood that the inward movement of the latch, pilot and wedge may be obtained hydraulically instead of under spring pressure, although there is some advantage in using the hydraulic pressure for outward movement, as shown. This arises from the fact that the dial is turned by a strong hydraulic push in order to overcome friction due to particles of plastic adhering to the end plates. It is therefore important to ensure positive release of the pilot before the dial is turned. It is also important to ensure positive removal of the clamping wedge before the die is opened, for otherwise there would be improper wear of the nozzle surfaces.

The downward movement of the transfer plunger may be obtained by spring pressure instead of hydraulically, although the hydraulic movement has the advantage of ensuring positive withdrawal of the plunger despite possible adherence of particles of plastic. Here too, it is important to ensure retraction of the plunger before rotation of the dial, for the plunger is very small in diameter and would be damaged by movement of the dial.

The upward movement of the plunger may be timed by an hydraulic valve alone, instead of by means of a mechanical release latch supplementing the hydraulic valve, but the latch is a safety feature which protects the plunger against the possibility of the dial hole not being properly registered. It is important to protect the plunger against premature movement in such case, because the head of the plunger acts as a core, and if marred by striking the dial, the scoop pockets would be imperfect, which in turn would lead to faulty operation of the finished slide fastener.

Preheating of the rodlet may be by means other than steam, and the final heating of the rodlet may be by means other than radio-frequency energy, but radio-frequency heating is preferred in the nozzle because the heating time available is extremely short, and heat should preferably be generated instantaneously throughout the mass of the rodlet. On the other hand, conduction heating is satisfactory for preheating the rod, because considerable heating time is available at that point. This preheating, however, may be electrical under thermostatic control, instead of by means of steam, as shown. The dial is thermally insulated from the remainder of the machine in such a manner as to help control the temperature of the rodlet chambers in the dial. The temperature of the chambers need be only a little higher than the desired temperature for the rodlet, because considerable time is available during which the rodlet is in the chamber. In any case, the heating may be accomplished in less or more than the two stages here shown.

These and numerous other changes may be made in the apparatus disclosed, and it will therefore be apparent that while I have shown and described my invention in a preferred form, changes may be made without departing from the spirit of the invention, as sought to be defined in the following claims.

I claim:

1. Apparatus for molding a series of units out of a molding material, said apparatus including a feed channel through which a rod of the material is fed, an intermittently rotatable dial having top and bottom surfaces sliding between closely fitting stationary surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, and a die communicating with said nozzle, whereby the measured quantities of molding material cut off at the feed channel are transferred into the die by the transfer plunger.

2. Apparatus for molding a series of units out of a thermosetting material, said apparatus including a feed channel through which a rod of the material is fed, an intermittently rotatable dial having top and bottom surfaces sliding between closely fitting stationary surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, heating means for said nozzle, and a die communicating with said nozzle, whereby the measured quantities of thermosetting molding material cut off at the feed channel are heated, and transferred into the die by the transfer plunger.

3. Apparatus for molding a series of units out of a molding material, said apparatus including a feed channel through which a rod of the material is fed, means to heat said feed channel, an intermittently rotatable dial having top and bottom surfaces sliding between closely fitting stationary surfaces and provided with a series of measuring chambers passing through said dial, one of said chambers being aligned with the aforesaid feed channel to receive and sever a measured length of rod corresponding to one molded unit, another of said chambers being aligned with a tranfer plunger disposed on one side of the dial and a nozzle disposed on the opposite side of the dial, heating means for said nozzle, and a die communicating with said nozzle, whereby the measured quantities of molding material cut off at the feed channel are heated, and transferred into the die by the transfer plunger.

4. Apparatus for molding a series of units out of a molding material, said apparatus including an intermittently rotatable dial provided with a series of material supply chambers passing through said dial, one of said chambers being aligned with a transfer plunger disposed on one side of the dial and a nozzle disposed on the opposite side of the dial, and a die communicating with said nozzle, whereby a quantity of molding material in a chamber is transferred into the die by the transfer plunger, said dial, plunger and nozzle all being mounted for bodily movement toward and away from the die, and means to move the same toward the die at the beginning of each transfer operation, thereby forcing the dial against the nozzle and the nozzle against the die.

5. Apparatus for molding a series of units out of a molding material, said apparatus including a feed channel through which a rod of the material is fed, an intermittently rotatable dial having top and bottom surfaces sliding between closely fitting stationary surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, and a die communicating with said nozzle, whereby the measured quantities of molding material cut off at the feed channel are transferred into the die by the transfer plunger, said dial, plunger and nozzle all being mounted for bodily movement toward and away from the die, and means to move the same toward the die at the beginning of each transfer operation, thereby forcing the dial against the nozzle and the nozzle against the die.

6. Apparatus for molding a series of units out of a thermosetting material, said apparatus including a feed channel through which a rod of the material is fed, means to heat said feed channel, an intermittently rotatable dial having top and bottom surfaces sliding between closely fitting stationary surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, heating means for said nozzle, and a die communicating with said nozzle, whereby the measured quantities of thermosetting molding material cut off at the feed channel are heated, and transferred into the die by the transfer plunger, said dial, plunger and nozzle all being mounted for bodily movement toward and away from the die, and means to move the same toward the die at the beginning of each transfer operation, thereby forcing the dial against the nozzle and the nozzle against the die.

7. Apparatus for molding a series of slide fastener elements directly on a tape, said apparatus including a feed channel through which material is fed, an intermittently rotatable dial provided with a series of chambers passing through said dial, one of said chambers being aligned with the aforesaid feed channel to receive a measured charge of material corresponding to one molded fastener element, another of said chambers being aligned with a transfer plunger disposed on one side of the dial and a nozzle disposed on the opposite side of the dial, and a separable die adapted to be clamped against the tape with an edge of the tape passing through the mold cavity in the die, whereby the measured quantities of molding material are transferred into the die by the transfer plunger, the end of said plunger being suitably shaped to act as a core for forming a pocket in the fastener element.

8. Apparatus for molding a series of slide fastener elements directly on a tape, said apparatus including a feed channel through which a rod of thermosetting molding material is fed, an intermittently rotatable dial having top and bottom surfaces sliding between closely fitting stationary surfaces, and provided with a series of measuring chambers passing through said dial, one of said chambers being aligned with the aforesaid feed channel to receive and sever a measured length of rod corresponding to one molded fastener element, another of said chambers being aligned with a transfer plunger disposed on one side of the dial and a nozzle disposed on the opposite side of the dial, heating means surrounding said nozzle, and a separable die adapted to be clamped against the tape with an edge of the tape passing through the mold cavity in the die, whereby the measured quantities of thermosetting material cut off at the feed channel are heated, and transferred into the die by the transfer plunger, the end of said plunger being suitably shaped to act as a core for forming a pocket in the fastener element.

9. Apparatus for molding a series of slide fastener elements directly on a tape, said apparatus including a feed channel through which a rod of the molding material is fed, means to heat said feed channel, an intermittently rotatable dial having top and bottom surfaces sliding between closely fitting stationary surfaces, and provided with a series of measuring chambers passing through said dial, one of said chambers being aligned with the aforesaid feed channel to receive and sever a measured length of rod corresponding to one molded fastener element, another of said chambers being aligned with a transfer plunger disposed on one side of the dial and a nozzle disposed on the opposite side of the dial, heating means surrounding said nozzle, and a separable die adapted to be clamped against the tape with an edge of the tape passing through the mold cavity in the die, whereby the measured quantities of molding material cut off at the feed channel are heated, and transferred into the die by the transfer plunger, the end of said plunger being suitably shaped to act as a core for forming a pocket in the fastener element, and timing means for controlling the operation of the aforesaid parts in proper time sequence.

10. Apparatus for molding a series of units out of a molding material, said apparatus including a transfer plunger, a nozzle, heating means for said nozzle, a die communicating with said nozzle, said die including separable die halves separable in a direction transverse to the direction of the nozzle, means for moving said plunger through said nozzle whereby the end of the plunger acts as a core for said die and a pilot stud fixed in location relative to the nozzle for engaging and accurately centering the die halves relative to the nozzle when the die is closed.

11. Apparatus for molding a series of units out of a molding material, said apparatus including a feed channel through which a rod of the material is fed, an intermittently rotatable dial having top and bottom surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, a die communicating with said nozzle, said die including separable die halves separable in a direction transverse to the direction of the nozzle, and a pilot stud fixed in location relative to the nozzle for engaging and accurately centering the die halves relative to the nozzle when the die is closed.

12. Apparatus for molding a series of units out of a molding material, said apparatus including a feed channel through which a rod of the material is fed, an intermittently rotatable dial having top and bottom surfaces and provided with a series of measuring chambers passing through said dial, one of said chambers being aligned with the aforesaid feed channel to receive and sever a measured length of rod corresponding to one molded unit, another of said chambers being aligned with a transfer plunger disposed on one side of the dial and a nozzle disposed on the opposite side of the dial, a die communicating with said nozzle, said die including separable die halves separable in a direction transverse to the direction of the nozzle, a pilot stud fixed in location relative to the nozzle for engaging and accurately centering the die halves relative to the nozzle when the die is closed, said dial, plunger and nozzle all being mounted for bodily movement toward and away from the die, and means to move the same toward the die at the beginning of each transfer operation, thereby forcing the dial against the nozzle and the nozzle against the die.

13. In the molding of a series of slide fastener elements directly on a tape, the method which includes preliminarily forming molding material into a long slender rod, clamping die halves against a tape with an edge of the tape passing through the mold cavity in the die, severing from the rod a predetermined measured length corresponding in amount to one fastener element, confining and shifting said severed length to a position in front of a plunger having its end formed to provide a core, said plunger being movable in the parting plane of the die halves, transferring the resulting severed length as a discrete body in axial direction to the mold cavity by movement of the plunger, said movement being of sufficient extent to position the end of the plunger within the mold cavity to form an undercut part of the fastener element by means of said plunger.

14. In the molding of a series of slide fastener elements directly on a tape, the method which includes preliminarily forming thermosetting material into a long slender potentially reactive rod, clamping heated die halves against a tape with an edge of the tape passing through the mold cavity in the die, severing from the rod a predetermined measured length corresponding in amount to one fastener element confining and shifting said severed length to a position in front of a plunger having its end formed to provide a core, said plunger being movable in the parting plane of the die halves, transferring the resulting severed length as a discrete body in axial direction to the mold cavity by movement of the plunger, said movement being of sufficient extent to position the end of the plunger within the mold cavity to form an undercut part of the fastener element by means of said plunger, and heating the severed length further during its transfer to the die.

15. In the molding of a series of slide fastener elements directly on a tape, the method which includes preliminarily forming thermosetting material into a long slender potentially reactive rod of uniform diameter, clamping die halves against a tape with an edge of the tape passing through the mold cavity in the die, preheating the end of the rod, severing from the rod a predetermined measured length corresponding in amount to one fastener element confining and shifting said severed length to a position in front of a plunger having its end formed to provide a core, said plunger being movable in the parting plane of the die halves, transferring the resulting severed length as a discrete body in axial direction to the mold cavity by movement of the plunger, said movement being of sufficient extent to position the end of the plunger within the mold cavity to form an undercut part of the fastener element by means of said plunger, and heating the severed length further during its transfer to the die.

16. Apparatus for molding a series of slide fastener elements directly on a tape, said apparatus comprising means for feeding a long slender rod of molding material, means closely surrounding a predetermined measured short length sufficient for one fastener element at the end of the rod, said means being movable laterally for displacing said measured length and thereby severing the same from the rod, separable die portions adapted to be clamped around the tape with the edge of the tape passing through the mold cavity in the die, and means including a plunger for transferring the resulting severed length as a discrete body in axial direction to the die.

17. Apparatus for molding a series of slide fastener elements directly on a tape, said apparatus comprising means for preheating the end of a long slender rod of potentially reactive thermosetting material, means closely surrounding a predetermined measured short length sufficient for one fastener element at the end of the rod, said means being movable laterally for displacing said measured length and thereby severing the same from the rod, separable die portions adapted to be clamped around the tape with the edge of the tape passing through the mold cavity in the die, means including a plunger for transferring the resulting severed length as a discrete body in axial direction to the die, and heating means for heating the discrete body of material during its transfer to the die.

18. Apparatus for molding a series of slide fastener elements directly on a tape, said apparatus comprising means for feeding a long slender rod of molding material, means closely surrounding a predetermined measured short length sufficient for one fastener element at the end of the rod, said means being movable laterally for displacing said measured length and thereby severing the same from the rod and moving it to the plane of the tape, separable die portions adapted to be clamped around the tape with the edge of the tape passing through the mold cavity in the die, means including a plunger in the plane of the tape for transferring the resulting severed length as a discrete body in axial direction to the die, the end of said plunger being received by said die and being suitably shaped to act as a core for forming an undercut part of the fastener element.

19. Apparatus for molding a series of slide fastener elements directly on a tape, said apparatus comprising means for preheating the end of a long slender rod of potentially reactive thermosetting material, means closely surrounding a predetermined measured short length sufficient for one fastener element at the end of the rod, said means being movable laterally for displacing said measured length and thereby severing the same from the rod and moving it to the plane of the tape, separable die portions adapted to be clamped around the tape with the edge of the tape passing through the mold cavity in the die, means including a plunger in the plane of the tape for transferring the resulting severed length as a discrete body in axial direction into the die, and heating means for heating the material during its transfer to the die, the end of said plunger being received by said die and being suitably shaped to act as a core for forming an undercut part of the fastener element.

20. Apparatus for molding a series of small units out of a molding material, said apparatus including a feed channel through which a rod of the material is fed, a movable plate having parallel faces sliding between closely fitting surfaces and provided with a measuring chamber passing through said plate, said chamber in one position of the plate being aligned with the aforesaid feed channel to receive and by movement to sever a measured length of rod corresponding to one molded unit, said chamber fitting said rod to keep the severed piece under control, said chamber in another position of the plate being aligned with a transfer plunger disposed on one side of the plate and a nozzle disposed on the opposite side of the plate, and a die communicating with said nozzle, whereby the measured quantities of molding material cut off at the feed channel are transferred into the die by the transfer plunger.

21. Apparatus for molding a series of small units out of a molding material, said apparatus including a feed channel through which a rod of the material is fed, a movable plate having parallel faces sliding between closely fitting surfaces and provided with a measuring chamber passing through said plate, said chamber in one position of the plate being aligned with the aforesaid feed channel to receive and by movement to sever a measured length of rod corresponding to one molded unit, said chamber fitting said rod to keep the severed piece under control, said chamber in another position of the plate being aligned with a transfer plunger disposed on one side of the plate and a nozzle disposed on the opposite side of the plate, and a die communicating with said nozzle, whereby the measured quantities of molding material cut off at the feed channel are transferred into the die by the transfer plunger, said plate, plunger and nozzle all being mounted for bodily movement toward and away from the die, and means to move the same toward the die at the beginning of each transfer operation, thereby forcing the plate against the nozzle and the nozzle against the die.

22. Apparatus for molding a series of slide fastener elements directly on a tape, said apparatus including a feed channel through which a rod of molding material is fed, a movable plate having parallel faces sliding between closely fitting surfaces and provided with a measuring chamber passing through said plate, said chamber in one position of the plate being aligned with the aforesaid feed channel to receive and by movement to sever a measured length of rod corresponding to one molded unit, said chamber fitting said rod to keep the severed piece under control, said chamber in another position of said plate being aligned with a transfer plunger disposed on one side of the plate and a nozzle disposed on the opposite side of the plate, a die communicating with said nozzle, said die including separable die halves separable in a direction transverse to the direction of the nozzle, the measured quantities of molding material being transferred to the die by the transfer plunger.

23. Apparatus for molding a series of slide fastener elements directly on a tape, said apparatus including a feed channel through which a rod of molding material is fed, a movable plate having parallel faces sliding between closely fitting surfaces and provided with a measuring chamber passing through said plate, said chamber in one position of the plate being aligned with the aforesaid feed channel to receive and by movement to sever a measured length of rod corresponding to one molded unit, said chamber fitting said rod to keep the severed piece under control, said chamber in another position of said plate being aligned with a transfer plunger disposed on one side of the plate and a nozzle disposed on the opposite side of the plate, a die communicating with said nozzle, said die including separable die halves separable in a direction transverse to the direction of the nozzle and adapted to be clamped around the tape with the edge of the tape passing through the mold cavity in the die, the measured quantities of molding material being transferred to the die by the transfer plunger, and the end of said plunger being suitably shaped to act as a core for forming an undercut part of the fastener element.

LESTER L. JONES.

REFERENCES CITED

The following references are of record in the file of this patent:

UNITED STATES PATENTS

| Number | Name | Date |
|---|---|---|
| 1,597,803 | Kearney et al. | Aug. 31, 1926 |
| 1,927,375 | Schmidt | Sept. 19, 1933 |
| 1,950,568 | Richards | Mar. 13, 1934 |
| 1,971,652 | Haessler | Aug. 28, 1934 |
| 2,088,134 | Haessler | July 27, 1937 |
| 2,102,328 | Morin et al. | Dec. 14, 1937 |
| 2,111,857 | Jeffery | Mar. 22, 1938 |
| 2,131,319 | Greenholtz | Sept. 27, 1938 |
| 2,356,338 | Misfeldt | Aug. 22, 1944 |
| 2,396,348 | Sinclair et al. | Mar. 12, 1946 |
| 2,398,318 | MacMillin et al. | Apr. 9, 1946 |
| 2,469,342 | Richardson | May 3, 1949 |